(12) United States Patent
Patterson

(10) Patent No.: US 8,227,941 B2
(45) Date of Patent: Jul. 24, 2012

(54) SYSTEM AND METHOD FOR GENERATOR PHASE SIGNAL MONITORING AND CONTROL

(75) Inventor: Ciaran Patterson, Chicago, IL (US)

(73) Assignee: C.E. Niehoff & Co., Evanston, IL (US)

( * ) Notice: Subject to any disclaimer, the term of this patent is extended or adjusted under 35 U.S.C. 154(b) by 474 days.

(21) Appl. No.: 12/460,659

(22) Filed: Jul. 23, 2009

(65) Prior Publication Data

US 2011/0018504 A1    Jan. 27, 2011

(51) Int. Cl.
  *H01H 9/54* (2006.01)
(52) U.S. Cl. ............................................. 307/140
(58) Field of Classification Search ............ 307/140
  See application file for complete search history.

(56) References Cited

U.S. PATENT DOCUMENTS

| | | |
|---|---|---|
| 3,971,007 A | 7/1976 | Borkovitz et al. |
| 4,044,296 A | 8/1977 | Dhyanchand et al. |
| 4,317,223 A | 2/1982 | Farmer, Jr. |
| 4,348,629 A | 9/1982 | Sievers |
| 4,399,409 A | 8/1983 | Thompson |
| 4,403,292 A | 9/1983 | Ejzak et al. |
| 4,412,169 A | 10/1983 | Dell'Orto |
| 4,430,292 A | 2/1984 | Shimada et al. |
| 4,452,079 A | 6/1984 | Tiller |
| 4,467,277 A | 8/1984 | Jones et al. |
| 4,471,299 A | 9/1984 | Elmis |
| 4,496,900 A | 1/1985 | Di Stefano et al. |
| 4,607,246 A | 8/1986 | Wada et al. |
| 4,806,846 A | 2/1989 | Kerber |
| 4,937,530 A | 6/1990 | Vogt et al. |
| 5,126,678 A | 6/1992 | Williams |
| 5,315,229 A | 5/1994 | Markus |
| 5,517,422 A | 5/1996 | Ilic et al. |
| 5,672,974 A | 9/1997 | Turner |
| 5,929,612 A | 7/1999 | Eisenhaure et al. |
| 6,157,175 A | 12/2000 | Morinigo et al. |
| 6,172,509 B1 | 1/2001 | Cash et al. |
| 6,404,222 B1 | 6/2002 | Fan et al. |
| 6,696,828 B2 | 2/2004 | Yoshizawa |
| 6,744,239 B2 | 6/2004 | Fukushima et al. |
| 6,762,593 B2 | 7/2004 | Kusase et al. |
| 6,791,301 B2 | 9/2004 | Henkel et al. |
| 6,801,020 B2 | 10/2004 | Blackburn |
| 7,026,724 B1 | 4/2006 | Blackburn |
| 7,138,729 B2 | 11/2006 | Bailey |
| 2002/0024323 A1 | 2/2002 | Fukushima et al. |
| 2002/0101221 A1 | 8/2002 | Stefanovic et al. |
| 2003/0006740 A1 | 1/2003 | Henkel et al. |
| 2003/0071633 A1 | 4/2003 | Fedirchuk et al. |
| 2004/0100228 A1 | 5/2004 | Blackburn |

(Continued)

*Primary Examiner* — Robert L. Deberadinis
(74) *Attorney, Agent, or Firm* — Law Offices of Michael M. Ahmadshahi

(57) ABSTRACT

A vehicle electrical system comprises a generator and a control device coupled with the generator and operable to protect the generator from catastrophic failure while providing the electrical load in the electrical system with sufficient electrical power. The control device determines a loss of symmetry between two alternating phase signals generated by a first and second phase windings of a single or multiple stator generator. In particular, the control device determines a first and second average values of two of the two or more alternating phase signals and either limits or ceases the total electrical output current of the generator, via a generator output power controller, when the first average value differs from the second average value by a predetermined value. The control device may alternatively be configured to generate an error signal without varying the generator's total electrical output current even in the event of a malfunction.

11 Claims, 7 Drawing Sheets

U.S. PATENT DOCUMENTS

| | | |
|---|---|---|
| 2005/0067900 A1 | 3/2005 | Bailey |
| 2006/0273765 A1 | 12/2006 | Mellor et al. |
| 2006/0290324 A1 | 12/2006 | Jabaji |
| 2007/0013387 A1 | 1/2007 | Smith et al. |
| 2007/0018637 A1 | 1/2007 | Kim et al. |
| 2007/0069579 A1 | 3/2007 | Bailey |

SYSTEM AND METHOD FOR GENERATOR PHASE SIGNAL MONITORING AND CONTROL

REFERENCE TO COMPUTER PROGRAM LISTINGS SUBMITTED ON COMPACT DISK

This specification includes a compact disk appendix, which contains computer program code listings pursuant to 37 C.F.R. 1.52(e), and is hereby incorporated by reference. The computer codes are in ASCII format and are as follows:

| Creation Date | Creation Time | File Size (Kilobytes) | File Name |
|---|---|---|---|
| Jun. 24, 2009 | 11:38 AM | 12 | CAN-1.H |
| Jun. 24, 2009 | 11:38 AM | 8 | DEFINES-1.H |
| Jun. 24, 2009 | 11:38 AM | 3 | DRIVERS-1.H |
| Jun. 24, 2009 | 11:38 AM | 4 | EEPROM-1.H |
| Jun. 24, 2009 | 11:38 AM | 7 | INIT-1.H |
| Jun. 24, 2009 | 11:38 AM | 4 | LIMIT-1.H |
| Jun. 24, 2009 | 11:38 AM | 8 | REGISTER-1.H |
| Jun. 24, 2009 | 11:38 AM | 6 | RTOS-1.H |
| Jun. 24, 2009 | 11:38 AM | 7 | SENSOR-1.H |
| Jun. 24, 2009 | 11:38 AM | 34 | TEST1-1.C |
| Jun. 24, 2009 | 11:38 AM | 14 | TEST-1.H |
| Jun. 24, 2009 | 11:38 AM | 9 | VECTORS-1.H |
| Mar. 20, 2009 | 2:33 PM | 120 | TEST1.MAP |
| Mar. 20, 2009 | 2:29 PM | 7 | DEFINES.H |
| Mar. 20, 2009 | 2:29 PM | 35 | TEST1.C |
| Jan. 15, 2009 | 11:19 AM | 6 | RTOS.H |
| Jan. 15, 2009 | 11:06 AM | 10 | VECTORS.H |
| Jan. 15, 2009 | 11:05 AM | 14 | CAN.H |
| Jan. 15, 2009 | 11:02 AM | 2 | DRIVERS.H |
| Jan. 15, 2009 | 11:01 AM | 9 | INIT.H |
| Aug. 10, 2007 | 1:42 PM | 7 | SENSOR.H |
| Aug. 15, 2007 | 12:59 PM | 10 | TEST.H |
| Jun. 4, 2004 | 11:00 AM | 2 | LINKER.PRM |
| Jun. 4, 2004 | 10:59 AM | 7 | REGISTER.H |
| Mar. 19, 2004 | 4:05 PM | 4 | EEPROM.H |
| Jan. 31, 2004 | 8:15 AM | 3 | SCRLIMIT.H |

COPYRIGHT

A portion of the disclosure of this patent document contains material which is subject to copyright protection. The owner has no objection to the facsimile reproduction by anyone of the patent disclosure, as it appears in the Patent and Trademark Office files or records, but otherwise reserves all copyright rights whatsoever.

FIELD OF INVENTION

This invention is related to a system and method for monitoring and control of a generator and electrical current in an electrical system. In particular, this invention relates to a control device, including a system and method, which monitors the phase signals generated by the generator's phase windings and controls the output power of the generator according to the phase signals. Additionally, the control device may operate upon one or more switches to control the magnitude and direction of electrical current through the electrical system according to the phase signals. The control device may be used in conjunction with the generator for improved monitoring, diagnostics, and control functions. The control device may be used in conjunction with a generator output power controller to limit or cease a total electrical output current.

BACKGROUND

The present invention relates to a control device, including a system and method, for monitoring a generator's phase signals to control the generator's output current and/or electrical current through an electrical system. In particular, the control device monitors two phase signals, generated by the generator phase windings, and responses to a loss of symmetry in the phase signals. The control device achieves this by comparing the two phase signals to one another as opposed to predetermined values. One of the advantages of the present method of relative comparison between two phases is that it eliminates the need to determine other parameters that affect the predetermined values, such as generator speed, electrical load, and direction of rotation. It should be noted that the term symmetry refers to the symmetry between different waveforms associated with the different phases, not for the positive and negative parts of an individual waveform associated with each of the two phases as is the case for traditional determination of AC system health. The loss of symmetry is generally an indication of generator malfunction which may damage the generator itself and/or electrical components in the electrical system. Upon detection of such loss of symmetry, the control device operates to limit or cease the generator output current via the generator output power controller and/or control the magnitude and direction of electrical current through the electrical system via a switch module. Alternatively, the control device may only generate a warning signal in response to the loss of symmetry.

Electrical systems, such as those implemented in modern vehicles or generator sets, include complex electronics and electrical equipment. Such electrical systems are normally comprised of an internal combustion engine and a generator. The engine supplies the generator with mechanical power where it is converted to electrical power. In a vehicle, for instance, the generator generates electrical power for the vehicle electrical system when the vehicle's engine is operating. In a generator set, the engine's mechanical power is converted to electrical power by the generator which is available via power output connectors. Such electrical systems further include energy storage devices such as batteries. The batteries and generator can operate either as a load or a source. Whenever the generator is not operating or can not produce sufficient electrical power, including the engine start process, the batteries provide electrical energy to the electrical system. The generator functions as a source of electrical energy after it attains a certain RPM, at which point electrical power is generated by the generator and delivered to the batteries and other electrical power consuming components within the electrical system.

Ordinarily, the generator includes a voltage regulator that maintains the generator voltage at a regulation voltage. Modern generators include a control device that, in addition to regulating the generator voltage, operates to monitor the generator performance in relation with the vehicle electrical and mechanical system. For instance, in a commonly assigned U.S. Pat. No. 7,466,107 entitled "System and Method for Electric Current and Power Monitoring and Control of a Generator," hereby incorporated by reference in its entirety, a control device in combination with a generator was disclosed where the control device operated to limit or cease the generator output current in response to an overload detected by measuring a voltage drop across a conductor embedded in the generator. The control device further operated to control the generator output current as a function of battery temperature, battery type, battery voltage, and the ratio between the RPMs of the engine and generator. Also, see Jabaji, U.S. Pat. No.

7,276,804 where a voltage regulator has been disclosed which, in addition to regulating the generator output voltage, operates to discern and respond to regulator, generator, and vehicle electrical system operation and malfunctions; Becker et al., U.S. Pat. No. 6,184,661, where the control device operates to limit the generator output power in order to protect the engine from excessive generator torque; and Jabaji, U.S. Pat. No. 5,907,233, where the control device monitors the AC signal generated by the stator windings and, in the absence of the AC signal, removes the field coil current in order to protect the battery from excessive drain.

In order to provide supplemental monitoring, diagnostics, and control functions, the control device may monitor the signals generated by the phase windings and control either or both the generator output current, and the magnitude and direction of electrical current through the electrical system. It should be noted that the present invention is not limited to sinusoidal, square, quasi-square, or any other form of symmetric waveform. A typical generator comprises stator windings that produce the generator output current via a varying magnetic field. Multi-phase generators have multiple stator windings that are connected via Δ (delta) or Y arrangement, known to skilled artisans. Each phase carries a proportional amount of the total generator output current. For instance in a 3-phase generator, each phase carries approximately ⅓ of the total generator output current, assuming the phase windings are identical.

Generators produce electrical power via their phase windings. In a multi-phase generator, the total electrical power generated by the generator is the sum of the electrical power generated by the individual phase windings. Accordingly, monitoring their performance can be useful in determining the performance of the generator. The signals generated by the phase windings can be compared to ascertain fault conditions associated with the generator. A loss of symmetry in the phase signals most likely is an indication of a malfunctioning generator. As stated above, the term symmetry refers to the symmetry between different waveforms associated with the different phases, not for the positive and negative parts of an individual waveform associated with each of the two phases as is the case for traditional determination of AC system health. Specifically, the loss of symmetry could be due to shorted phase windings and/or one or more faulty rectifying diodes. When such malfunctions occur, it is desirable to control the output current of the generator and/or the magnitude and direction of the electrical current in the electrical system.

In general, a shorted phase winding produces such excessive temperatures that the event can lead to total generator failure. The shorted phase could be due to a short between windings, within winding turns, alternator casing, etc. The rate at which the temperature of the phase windings reaches the point of catastrophic failure depends on the electrical load being delivered by the generator. When the generator is operating at or near full load, these extreme temperatures occur in a relatively short period of time. Such catastrophic temperatures could be delayed or avoided if the generator output current is limited or ceased. Preferably, upon detection of a shorted phase winding, it would be desirable to turn off the generator output current before it undergoes irreversible damage. However, there are many situations in which the electrical system solely depends on the generator output power to provide electrical power to the electrical devices within the electrical system. Under these circumstances, it is desirable to limit the generator output current to avoid the extreme temperatures while delivering enough power to vital components within the electrical system until the generator is repaired.

Additionally, a warning or a control signal can be generated to either warn the operator to reduce the electrical load by manually switching off certain electrical components, or to apply the control signal to a switch module to automatically disconnect unnecessary electrical loads.

SUMMARY

The present invention discloses a vehicle electrical system comprising a generator and a control device. The generator comprises two or more phase windings associated with one or more stators. The phase windings operate to generate two or more alternating phase signals. The control device is responsive to the two or more phase signals and operate to determine a first and second average values of two of the two or more alternating phase signals, and to at least one of limit and cease a total electrical output current of the generator, via a generator output power controller, when the first average value differs from the second average value by a predetermined value. Preferably, the two or more alternating phase signals comprise two or more alternating phase voltage signals. In another instance, the two or more alternating phase signals comprise two or more alternating phase current signals. Preferably, the two alternating phase signals are generated by two different phase windings associated with two different stators. Preferably, the generator output power controller comprises at least one of a voltage regulator, a field coil, and a semiconductor switch. Preferably, the predetermined value is substantially between 1% and 5%.

In another aspect, a vehicle electrical system comprising a generator and a control device is disclosed. The generator comprises two or more phase windings associated with one or more stators which generate two more alternating phase signals. The control device is responsive to the two or more phase signals and operate to determine a first and second average values of two of the two or more alternating phase signals, and to at least one of limit and cease a total electrical output current of the generator, via a generator output power controller, when the first average value differs from the second average value by a predetermined value. Preferably, the control device is further operative to generate an error signal indicative of a fault condition when the first average value differs from the second average value by the predetermined value.

In another aspect, a vehicle electrical system comprising a generator and a control device is disclosed. The generator comprises two or more phase windings associated with one or more stators which generate two more alternating phase signals. The control device is responsive to the two or more phase signals and operate to determine a first and second average values of two of the two or more alternating phase signals, and to at least one of limit and cease a total electrical output current of the generator, via a generator output power controller, when the first average value differs from the second average value by a predetermined value. Preferably, the control device further comprises a voltage regulator capable of maintaining an output voltage of the generator substantially at a regulation voltage.

In another aspect, a method for controlling a vehicle electrical system including a generator is disclosed. The method comprises generating two or more alternating phase signals via two or more phase windings associated with one or more stators included in the generator, determining a first and second average values of two of the two or more alternating phase signals, and at least one of limiting and ceasing total electrical output current of the generator, via a generator output power controller, when the first average value differs from the second average value by a predetermined value.

In another aspect, a method for controlling a vehicle electrical system including a generator is disclosed. The method comprises generating two or more alternating phase signals via two or more phase windings associated with one or more stators included in the generator, determining a first and second average values of two of the two or more alternating phase signals, and at least one of limiting and ceasing total electrical output current of the generator, via a generator output power controller, when the first average value differs from the second average value by a predetermined value. Preferably, the method further includes generating an error signal indicative of a fault condition when the first average value differs from the second average value by the predetermined value.

In another aspect, a method for controlling a vehicle electrical system including a generator is disclosed. The method comprises generating two or more alternating phase signals via two or more phase windings associated with one or more stators included in the generator, determining a first and second average values of two of the two or more alternating phase signals, and at least one of limiting and ceasing total electrical output current of the generator, via a generator output power controller, when the first average value differs from the second average value by a predetermined value. Preferably, the method further includes maintaining an output voltage of the generator substantially at a regulation voltage via a voltage regulator.

In another aspect, a control device for a generator is disclosed. The generator comprises two or more phase windings associated with one or more stators. The two or more phase windings operate to generate two or more alternating phase signals. The control device comprises a processor coupled with two or more phase windings and a generator output power controller. The processor includes a programming code operable on the processor. The processor is configured to measure the two or more alternating phase signals via two or more lines, determine a first and second average values of two of the two or more alternating phase signals, and apply a control signal to the generator output power controller to at least one of limit and case a total electrical output current of the generator, via a control line, when the first average value differs from the second average value by a predetermined value. Preferably, the two or more alternating phase signals comprise two or more alternating phase voltage signals wherein each alternating phase voltage signal is measured between one end of the corresponding phase winding and ground. In another instance, each of the alternating phase voltage signals is measured between one end of the corresponding phase winding and a reference point at a DC voltage as is the case in an isolated ground configuration. Preferably, the two alternating phase signals are generated by two different phase windings associated with two different stators. Preferably, the generator output power controller comprises at least one of a voltage regulator, a field coil, and a semiconductor switch. Preferably the processor is configured to determine the first and second average values by filtering the two or more alternating phase signals and calculating a first and second DC values from two of the two or more filtered alternating phase signals. Preferably, the processor is configured to apply a phase modulated signal to limit the total electrical output current of the generator. Preferably, the processor is configured to apply a step signal to cease the total electrical output current of the generator. Preferably, the processor is configured to apply a control signal to the generator output power controller to at least one of limit and cease a total electrical current of the generator, via the control line, when a ratio between the first and second average values is outside of a predetermined range. Preferably, the predetermined range is substantially between 95% and 105%.

In another aspect, a control device for a generator is disclosed. The generator comprises two or more phase windings associated with one or more stators. The two or more phase windings operate to generate two or more alternating phase signals. The control device comprises a processor coupled with two or more phase windings and a generator output power controller. The processor includes a programming code operable on the processor. The processor is configured to measure the two or more alternating phase signals via two or more lines, determine a first and second average values of two of the two or more alternating phase signals, and apply a control signal to the generator output power controller to at least one of limit and case a total electrical output current of the generator, via a control line, when the first average value differs from the second average value by a predetermined value. Preferably, the processor is further configured to generate an error signal indicative of a fault condition, via a communication line, when the first average value differs from the second average value by the predetermined value.

In another aspect, a control device for a generator is disclosed. The generator comprises two or more phase windings associated with one or more stators. The two or more phase windings operate to generate two or more alternating phase signals. The control device comprises a processor coupled with two or more phase windings and a generator output power controller. The processor includes a programming code operable on the processor. The processor is configured to measure the two or more alternating phase signals via two or more lines, determine a first and second average values of two of the two or more alternating phase signals, and apply a control signal to the generator output power controller to at least one of limit and case a total electrical output current of the generator, via a control line, when the first average value differs from the second average value by a predetermined value. Preferably, the processor is further configured to measure an output voltage of the generator, via an output-voltage line, and to vary a duty cycle of the generator output power controller, via the control line, so that the output voltage is substantially equal to a regulation voltage.

In another aspect, a method for controlling a generator is disclosed. The generator comprises two or more phase windings associated with one or more stators. The two or more phase windings operate to generate two or more alternating phase signals. The method comprises measuring the two or more alternating phase signals, determining a first and second average values of two of the two or more alternating phase signals, and applying a control signal to a generator output power controller to at least one of limit and case a total electrical output current of the generator, via a control line, when the first average value differs from the second average value by a predetermined value. Preferably, the method of measuring the two or more alternating phase signals, via two or more lines, comprises measuring two or more alternating phase voltage signals between one end of the corresponding phase winding and ground. In an isolated ground system, the measurements are made between the phase and a reference point at a DC voltage. Preferably, the method of determining a first and second average values of two of the two or more phase signals comprises filtering the two or more alternating phase signals and calculating a first and second DC values from two of the two or more filtered alternating phase signals. Preferably, the method of applying a control signal to the generator output power controller comprises applying a phase modulated signal to limit the total electrical output current of the generator. Preferably, the method of applying a control signal to the generator output power controller comprises applying a step signal to cease the total electrical output current of the generator. Preferably, the method of applying a control signal to the generator output power controller to at least one of limit and cease a total electrical output current of the generator, via the control line, comprises applying the control signal when a ratio between the first and second average values is outside of a predetermined range.

In another aspect, a method for controlling a generator is disclosed. The generator comprises two or more phase windings associated with one or more stators. The two or more phase windings operate to generate two or more alternating phase signals. The method comprises measuring the two or more alternating phase signals, determining a first and second average values of two of the two or more alternating phase signals, and applying a control signal to a generator output power controller to at least one of limit and case a total electrical output current of the generator, via a control line, when the first average value differs from the second average value by a predetermined value. Preferably, the method further comprises generating an error signal indicative of a fault condition, via a communication line, when the first average value differs from the second average value by the predetermined value.

In another aspect, a method for controlling a generator is disclosed. The generator comprises two or more phase windings associated with one or more stators. The two or more phase windings operate to generate two or more alternating phase signals. The method comprises measuring the two or more alternating phase signals, determining a first and second average values of two of the two or more alternating phase signals, and applying a control signal to a generator output power controller to at least one of limit and case a total electrical output current of the generator, via a control line, when the first average value differs from the second average value by a predetermined value. Preferably, the method further comprises measuring an output voltage of the generator, via an output-voltage line, and varying a duty cycle of the generator output power controller, via the control line, so that the output voltage is substantially equal to a regulation voltage.

In another aspect, a control device for a generator is disclosed. The generator comprises two or more phase windings associated with one or more stators. The two or more phase windings operate to generate two or more alternating phase signals. The control device comprises a processor coupled with two or more phase windings and a generator output power controller. The processor includes a programming code operable on the processor. The processor is configured to measure the two or more alternating phase signals via two or more lines, determine a first and second average values of two of the two or more alternating phase signals, and generate an error signal indicative of a fault condition, via a communication means, when the first average value differs from the second average value by a predetermined value. Preferably, the communication means comprises a communication terminal, coupled with a computer system, capable of transmitting/receiving a communication signal indicative of the fault condition. Preferably, the communication means comprises a light emitting diode, generating a flashing light pattern indicative of the fault condition.

In another aspect, a method for controlling a generator is disclosed. The generator comprises two or more phase windings associated with one or more stators. The two or more phase windings operate to generate two or more alternating phase signals. The method comprises measuring the two or more alternating phase signals, determining a first and second average values of two of the two or more alternating phase signals, and generating an error signal indicative of a fault condition, via a communication means, when the first average value differs from the second average value by a predetermined value.

DETAILED DESCRIPTION OF THE PRESENTLY PREFERRED EMBODIMENTS

Figure 1:
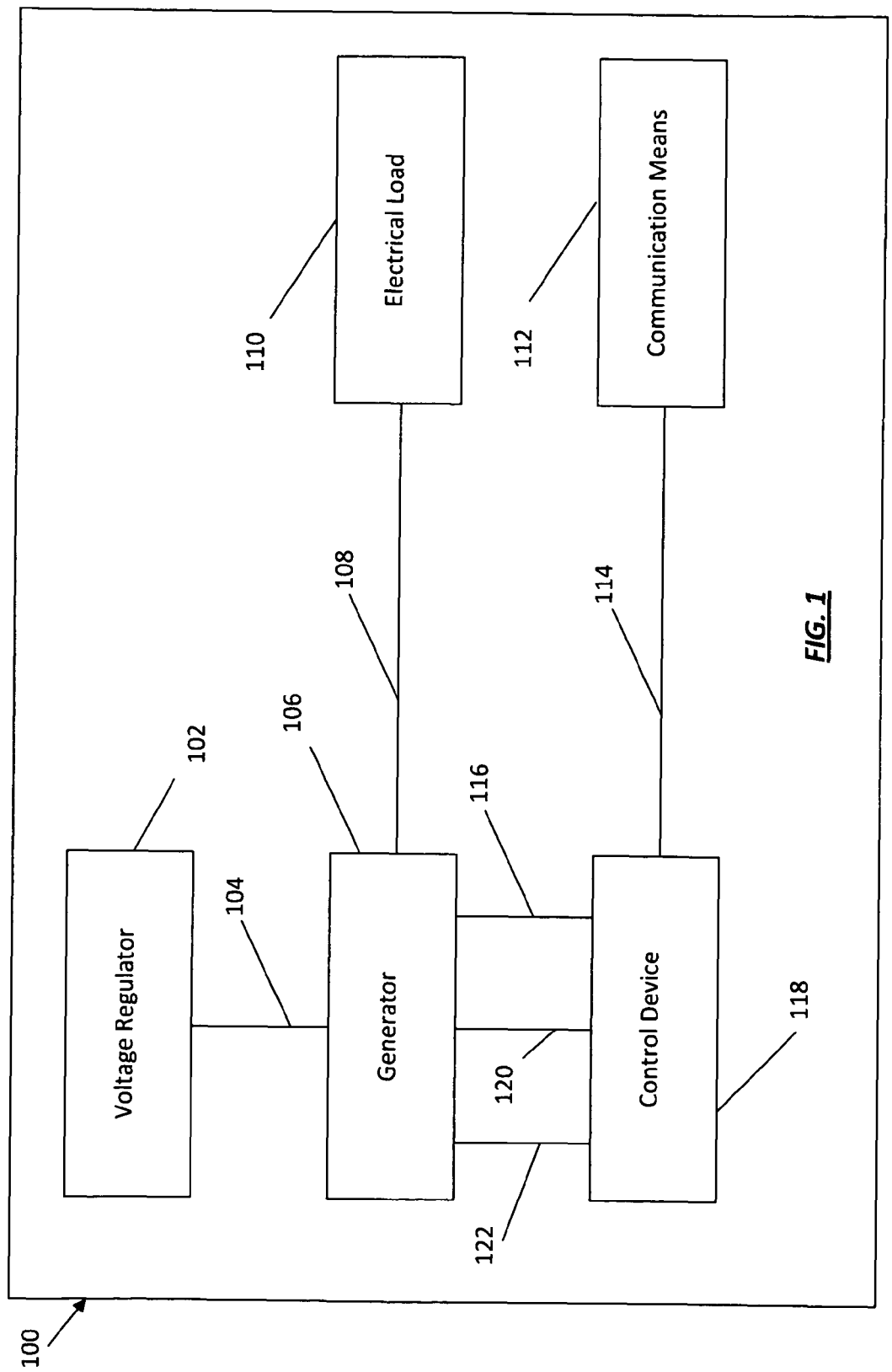
FIG. 1 shows a block diagram of a vehicle electrical system comprising a generator, a voltage regulator, electrical load, and control device according to a preferred embodiment.

FIG. 1 depicts a block diagram of a preferred embodiment of a vehicle electrical system 100, including a generator 106, a voltage regulator 102, electrical load 110, communication means 112, and a control device 118. The control device 118 is connected to and in communication with the generator 106 via lines 116, 120, and 122. The voltage regulator 102 operates to maintain the generator output voltage at a constant voltage as the speed of the generator 106 and electrical load 110 vary. The electrical load 110 represents electrical loads by electrical components which may comprise a heating element, an air conditioning unit, a compressor, a cooling fan, headlights, a battery, or a pump, to name a few examples. As these electrical loads are applied and removed from the generator 104, the voltage regulator 102 varies the output power of the generator 106, via the generator's output power controller (not shown), so as to meet the electrical power requirement of the electrical load 110.

In one embodiment, the generator 106 is a brushless alternator having two or more phase windings (not shown) associated with one or more stator windings (not shown). The generator 106 further includes a field coil (not shown) that generates a magnetic field when a field current passes through the field coil. The magnetic field interacts with the one or more stator windings in the generator (not shown), inducing voltage across the stators which, in turn, produce the generator output current through line 108 for consumption by the electrical load 110. The voltage regulator 102 is coupled with the generator field coil via line 104 and operates to regulate the system voltage at a regulation voltage, for instance 28 V, by switching on/off the field coil, thereby, varying the average value of the field current.

According to a one embodiment, the voltage regulator 102 comprises a switch to accomplish this. In one instance, the switch is disposed between one end of the field coil and output terminal of the generator 106. The voltage regulator 102 senses the output voltage of the generator 106 and applies a control signal, via line 104, to switch on/off the switch to maintain the system voltage at the regulation voltage.

According to another embodiment, the voltage regulator 102 comprises two switches to control the output power of the generator 106 and provide over voltage protection. The first switch is disposed between one end of the field coil and a voltage source, such as a battery (not shown), and a second switch is disposed between the other end of the field coil and the voltage source. The voltage regulator 102 senses the output voltage of the generator 106 and applies a control signal to switch on/off the first switch to maintain the system voltage at the regulation voltage, and applies another control signal to switch off the second switch in response to a generator output voltage that is above a threshold value for a predetermined time interval. Following this over voltage condition and upon a system reset, the regulator switches on the second switch to continue normal operation. In this two-switch configuration, the voltage regulator 102 uses the first switch to regulate the system voltage at the regulation voltage, and the second switch to further prevent over voltage conditions that may occur when an electrical load is suddenly disconnected.

In addition to power control and over voltage protection of the generator 106, afforded by the regulator 102, additional protection and control can be achieved by monitoring the two or more phase windings of the generator 106. The control device 118 is coupled with two phase windings via lines 116 and 122. The control device 118 is further coupled with the generator output power controller, in this case the field coil of the generator 106. The two phase windings generate two alternating phase signals that, under normal conditions, produce nearly the same average values, DC1 and DC2. The control device 118 determines these average values and may limit or cease the total electrical current of the generator 106, via line 120, when DC1 differs from DC2. It should be noted that the present invention is not limited to measurements of sinusoidal, square, quasi-square, or any other form of symmetric waveform. It is important to note that the control device 118 compares DC1 to DC2 as opposed to predetermined values. The advantage is that it eliminates the need to determine other parameters that affect the predetermined values, such as generator speed, electrical load, and direction of rotation. It is this loss of symmetry that is detected and used to control the total output current of the generator 106. It should be noted that the term symmetry refers to the symmetry between different waveforms associated with the different phases coupled with the lines 116 and 122, not for the positive and negative parts of an individual waveform associated with each of the two phases as is the case for traditional determination of AC system health.

This loss of symmetry between DC1 and DC2 indicates that the generator 106 is malfunctioning. Depending on the amount of symmetry loss, the control device 118 limits or ceases the generator's output current. If the loss of symmetry is outside of a first range, the control device 118 limits the total electrical output current of the generator 106. If the loss of symmetry is outside of a second range, the control device 118 ceases the total electrical output current of the generator 106. The control device 118 achieves this by controlling the generator output power controller.

According to the embodiment depicted in FIG. 1, the control device 118 utilizes line 120 to control the electrical current passing through the field coil of the generator 106. It should be clear to artisans of ordinary skill that the control device 118 and voltage regulator 102 have been so configured so that the control device 118 has the first priority control of the field coil over that of the voltage regulator 102. In other words, the control device 118's control of the field coil may not be interrupted by the voltage regulator 102 but the latter's control may be interrupted by the former. In an alternative embodiment, the control device 118 may be configured to further function as a voltage regulator, eliminating the need for a separate voltage regulator such as the voltage regulator 102.

The option to limit the generator's total electrical output current in light of a potential malfunction is that it allows the generator 106 to provide what power it can to the electrical load 110 until the vehicle is repaired. In addition to controlling the total electrical output current of the generator 106, the control device 118 utilizes line 114 to communicate the loss of symmetry to the communication means 112. The communication means 112 may be a light emitting diode, a vehicle computer system, or the vehicle's display panel.

Figure 2:
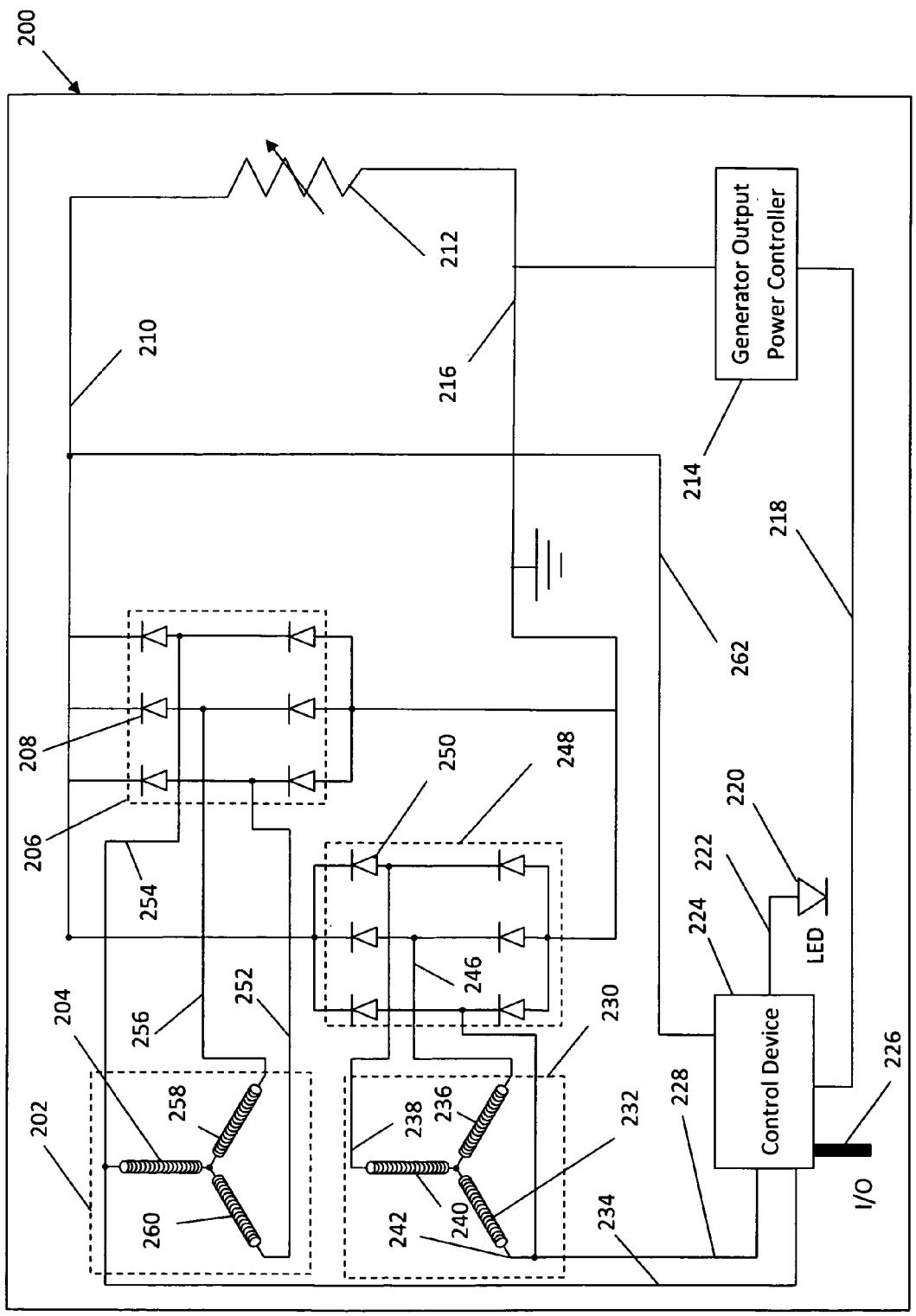
FIG. 2 shows a schematic diagram of a vehicle electrical system comprising a dual-stator generator and the associated phase windings, rectifier assemblies, electrical load, and a control device operative on the generator's output power controller to limit and/or cease the generator's output power according to a preferred embodiment.

FIG. 2 depicts a schematic diagram of the electrical connections between the various components within the vehicle electrical system 100 of FIG. 1 according to a preferred embodiment. A generator, such as the generator 106, comprises a generator output power controller 214 such as a field coil, two three-phase stator windings 202 and 230, and two full-wave rectifier circuits 206 and 248. The first stator 202 is comprised of three phase windings 204, 258, and 260. The phase windings 204, 258, and 260 generate three alternating phase signals on lines 254, 256, and 252, respectively. Such phase signals generally are not sinusoidal, square, quasi-square, or any other form of symmetric waveforms. The second stator 230 is comprised of three phase windings 232, 236, and 240. The phase windings 232, 236, and 240 generate three alternating phase signals on lines 242, 246, and 238, respectively. The generator 106 produces electrical current at its output 210, through an electrical load 212, to ground at 216. The electrical load 212 represents one or more electrical loads by electrical components such as those mentioned above. A control device 224 is coupled with the first and second stator windings 202 and 230 via lines 228 and 234. According to this embodiment, the control device 224 measures the alternating phase signals generated by the phase winding 204 and 240 of the first and second stator windings 202 and 230, respectively. The control device 224 is further coupled with the generator output power controller 214 via a line 218 and communication means, LED 220 and I/O Port via lines 222 and 226.

In this configuration as depicted in FIG. 2, however, the control device 224 also operates as a voltage regulator eliminating the need for a separate voltage regulator such the voltage regulator 102, FIG. 1. The control device 224 regulates the output voltage of the generator 106 by measuring its output voltage via an output voltage line 262 and varying a duty cycle of the generator output power controller 214 by applying a control signal via the line 218. In addition to maintaining the output voltage of the generator 106 at a regulation voltage, the control device 224 operates to determine a first and second average values, DC1 and DC2, of two of the alternating phase signals generated by two of the phase windings 204, 258, 260, 232, 236, and 240. It limits or ceases a total electrical output current of the generator 106 in response to a loss of symmetry between the first and second average values DC1 and DC2 by applying a control signal to the generator output power controller 214 via the line 218, when the first average value DC1 differs from the second average value DC2 by a predetermined value. The term symmetry refers to the symmetry between two different waveforms associated with two different phases amongst phase windings 204, 258, 260, 232, 236, and 240, not for the positive and negative parts of an individual waveform associated with each of the phases as is the case for traditional determination of AC system health.

The generator 106, as represented by the generator output power controller 214, two three-phase stator windings 202 and 230, and two full-wave rectifier circuits 206 and 248, is coupled with the electrical load 212. According to this embodiment, the generator output power controller 214 is a field coil which establishes a magnetic field when current passes through it as known to artisans of ordinary skill. The control device 224 controls the amount of electrical current that passes through the field coil. The generator 106 may be a brushless alternator. For a dual stator brushless alternator, as in this embodiment, a rotor is used as a means to vary the magnetic field through the stator windings 202 and 230, thereby creating an alternating current that is rectified via the two full-wave rectifier circuits 206 and 248. The rectified current is then fed to the electrical load 212.

The generator 106 is ordinarily used in a vehicle and thus subjected to shock and vibration. The generator 106 is further subjected to high ambient temperatures during operation. These conditions may give rise to phase winding and/or rectifier failure. Such failures affect the alternating current through the phase windings 204, 258, 260, 240, 236, and 232. During normal operating conditions, the average values of the alternating currents through these phase windings are nearly the same. When a failure of one of the phase windings, such as a shorted phase or rectifier diode, occurs the average values change accordingly. It should be noted that the present invention is independent of the normal changes in average waveform value associated with load surge, load dump, overload, soft start, and the like. The control device 224 may selectively limit or cease the field current through the field coil 214 based on the amount of change which is discussed in more detail below.

Figure 3:
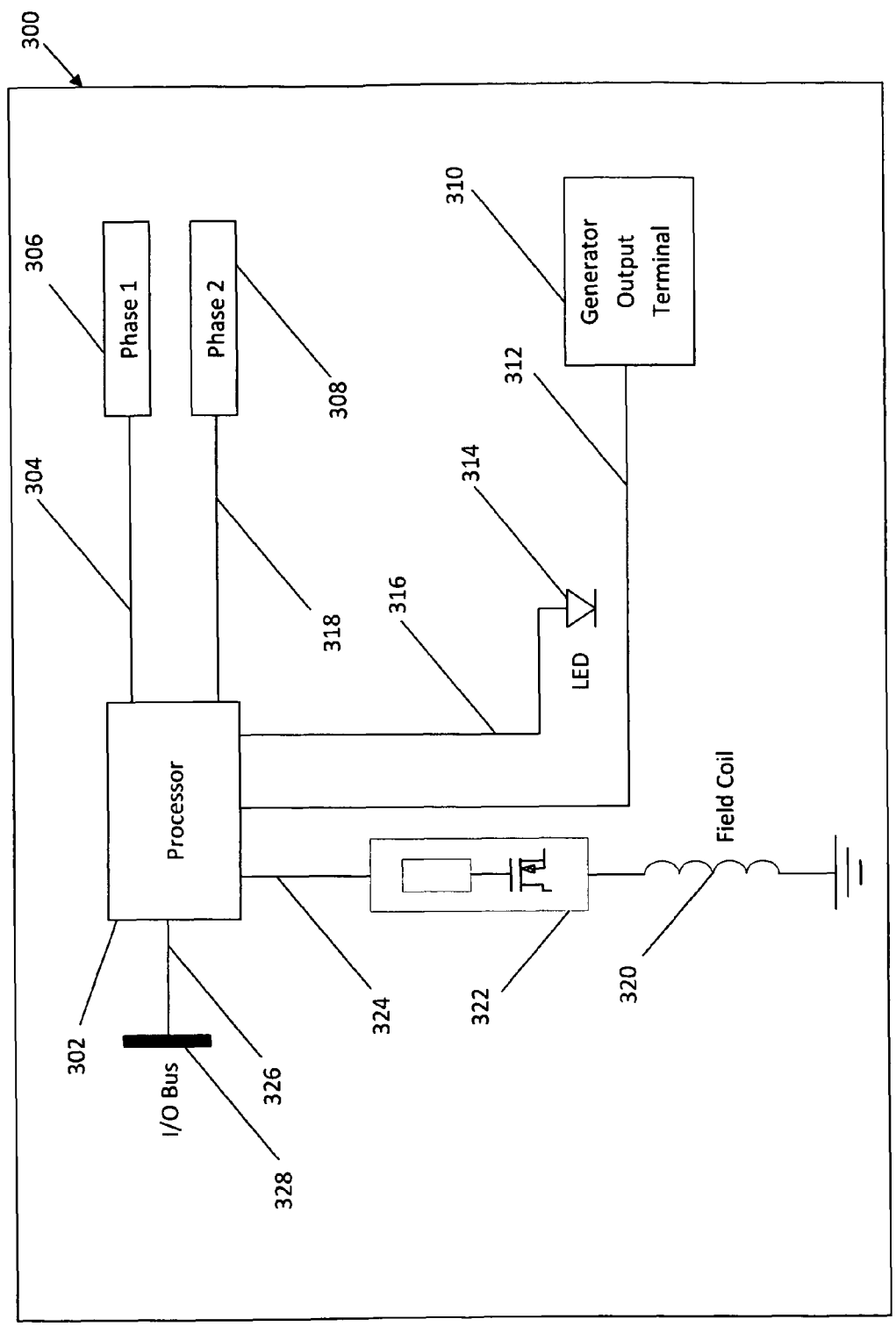
FIG. 3 shows a schematic diagram of a control device, including a processor, that measures two phase signals and controls the generator's field coil duty cycle in response to the phase signals while regulating the generator's output voltage and communicating the generator's status via an LED and I/O port according to a preferred embodiment.

FIG. 3 is a schematic diagram of a control device, such as the control device 224, including a processor 302. The control device 224 utilizes the processor 302 to measure alternating phase signals, generated by two phase windings 306 and 308, to measure an output voltage of a generator output terminal 310, and to vary the field current through a field coil 320 via switch 322. The processor 302 is also coupled with an I/O bus 328 and LED 314, via lines 326 and 316, respectively to indicate the operating status of the phases 306 and 308. The processor 302 may be analog or digital such as a microprocessor. In one preferred embodiment, the microprocessor is a 68HC08 processor having internal flash memory available from Freescale of Scottsdale, Ariz. It is contemplated that the processor may be a combination of individual discrete or separate integrated circuits packaged in a single housing or it may be fabricated in a single integrated circuit. The switch 322 may be a semiconductor switch.

The processor 302 is coupled with two phase windings 306 and 308 via lines 304 and 318. The phase windings 306 and 308 generate alternating phase voltage signals on the lines 304 and 318 whose DC values are nearly identical during normal operating conditions. According to one embodiment, the processor 302 measures the alternating phase voltage signals across one end of the phase winding 306, 308 and ground. The processor 302 obtains average values DC1 and DC2 of the alternating phase voltage signals. According to a preferred embodiment, the processor 302 filters the alternating phase voltage signals prior to determining the average values. A low pass digital filter known to artisans of ordinary skill may be utilized. The processor 302 uses the switch 322 to vary the field current through the field coil 320 in response to a loss of symmetry between the average values DC1 and DC2. The term symmetry refers to the symmetry between two different waveforms associated with phases 306 and 308, not for the positive and negative parts of an individual waveform associated with each of the phases 306 and 308. The loss of symmetry may be manifested in different ways, two of which are described in more detail below. Depending on the level of discrepancy between DC1 and DC2, the processor 302 either limits or ceases the field current through the field coil 322 so as to limit or cease the total electrical output current of the generator 106. If the difference is above a threshold, the processor 302 stops all field current through the field coil 320 by applying a step signal to the switch 322, thereby, ceasing the total electrical output current of the generator 106. If the difference is between a predetermined range, according to one embodiment, the processor 302 applies a phase modulated signal to the switch 322 so as to proportionally vary the field current through the field coil 320, thereby, limiting the total electrical output current of the generator 106.

The processor 302 may also communicate such fault conditions visually or through the vehicle computer system utilizing LED 314 and I/O bus 328 via the lines 316 and 326. According to one preferred embodiment, the processor 302 neither limits nor ceases the total electrical output current of the generator 106 but instead utilizes one or more of the communication means 314 and/or 328 to generate an error signal indicative of the fault conditions without affecting the generator output power in any way.

The processor 302 further measures the output voltage of the generator 106, at the generator output voltage terminal 310 via the line 312. According to this embodiment, the processor 302 also operates as a voltage regulator by maintaining the generator output voltage at a regulation voltage. The processor 302 uses the same switch 322 to vary the field current through the field coil 320 in order to regulate the generator output voltage.

Figure 4:
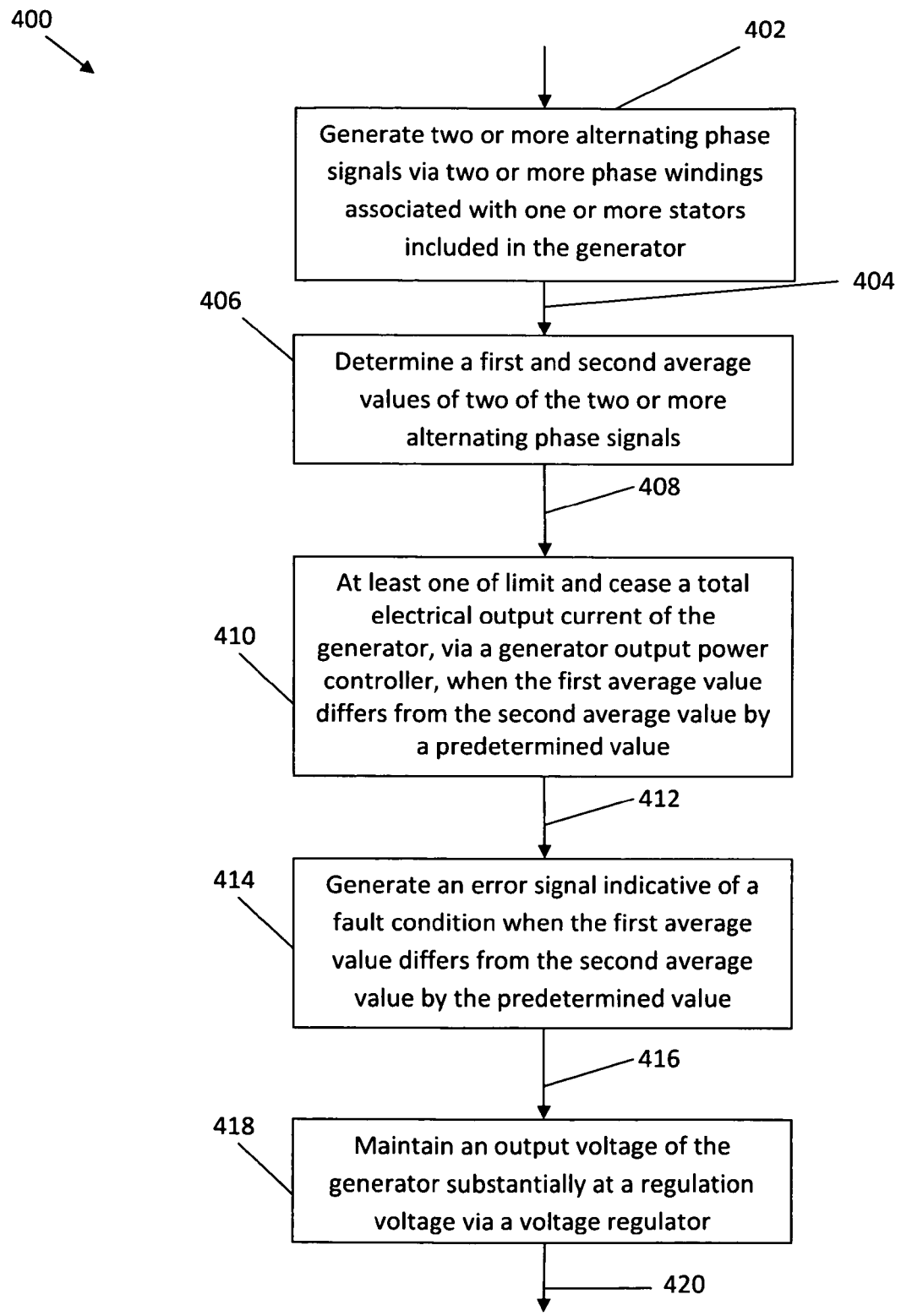
FIG. 4 is a flow diagram of one preferred method of monitoring and control of the generator in the vehicle electrical system of FIGS. 1 and 2, further illustrating the operation of the control device and utilization of the phase signals generated by the phase windings.

FIG. 4 is a flow diagram 400 of one preferred method of operation of the vehicle electrical system of FIG. 1. According to this embodiment, the method comprises generating two or more alternating phase signals via two or more phase windings associated with one or more stators included in the generator 106 at 402. In general, such phase signals are not sinusoidal, square, quasi-square, or any other form of symmetric waveforms. A first and second average values of two of the two or more alternating phase signals, such as DC1 and DC2 described above, are determined at 406, via the control device 118. DC1 and DC2 are compared to each other and a total electrical output current of the generator 106 is either limited or ceased via a generator output power controller, such as the field coil 320 in FIG. 3, when DC1 differs from DC2 by a predetermined value at 410. The method further includes generating an error signal via a communication means 112 at 414. According to this preferred embodiment, the method further includes regulating the output voltage of the generator 106 at a regulation voltage via the voltage regulator 102 at 418. As described above, the control device 118 can be configured to operate as a voltage regulator eliminating the need for a separate voltage regulator such as the voltage regulator 102. Also as described above, the method can be modified to eliminate step 410 whereby the control device 118 only generates an error signal indicative of a fault condition without limiting or ceasing the total electrical output current of the generator 106.

Figure 5:
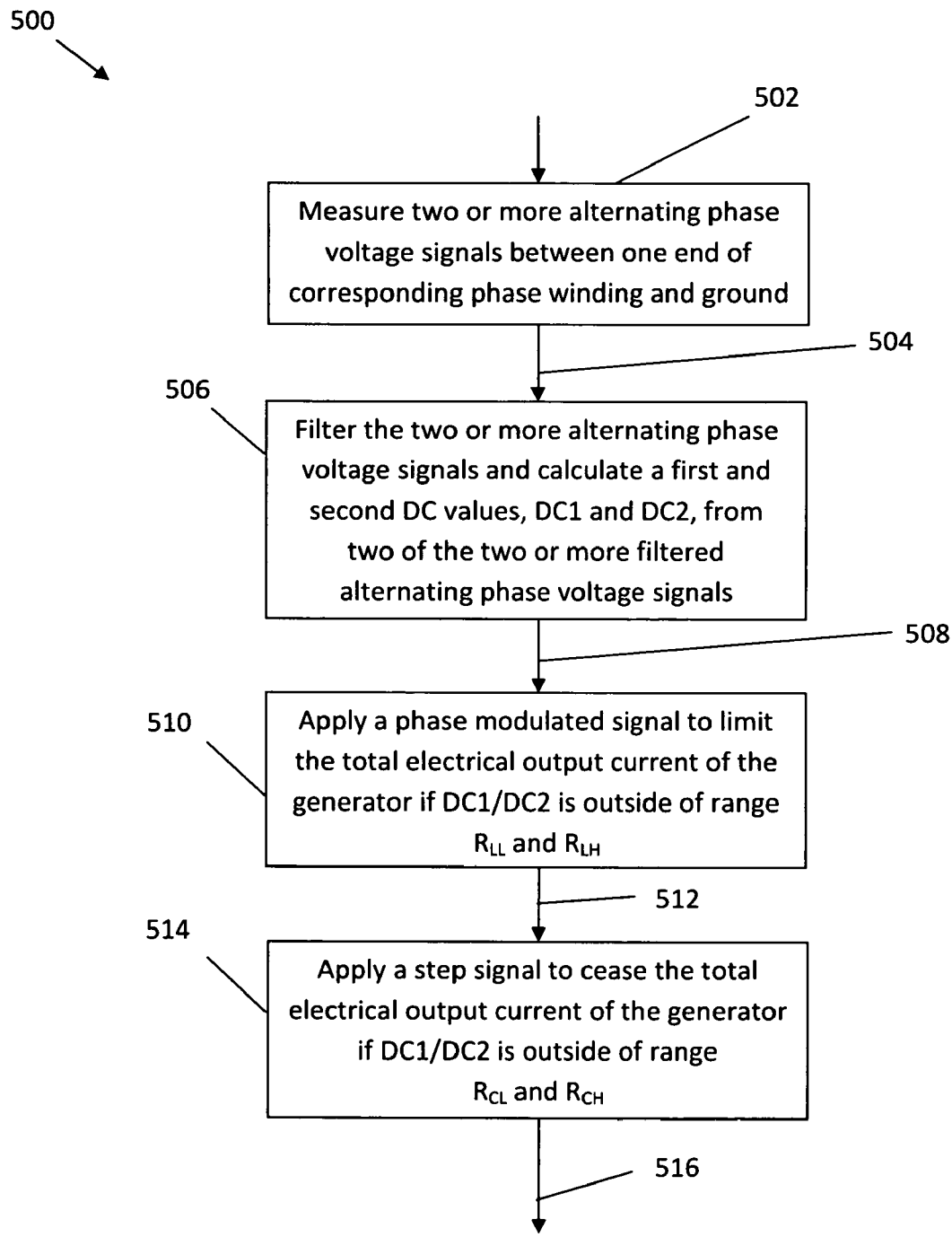
FIG. 5 is a flow diagram of one preferred method of monitoring and control of the generator in the vehicle electrical system of FIGS. 1 and 2, specifically illustrating the processing steps performed by the control device to ascertain whether to limit or cease the generator's total electrical output current.

FIG. 5 is a flow diagram 500 of one preferred method of operation of the control device of FIGS. 1 or 2 further illustrating the operation of a processor included in the control device such as the processor 302 of FIG. 3. The method includes measuring two or more alternating phase voltage signals between one end of the corresponding phase windings and ground at 502. According to this preferred embodiment, the processor 302 is a microprocessor and the alternating phase voltage signals generated by the two phases 306 and 308 are digitized using an analog to digital convertor included in the microprocessor 302. Preferably, the analog signals are first filtered via a low pass analog filter to avoid aliasing before the signals are digitized by said analog to digital convertor. The digitized signals are then filtered, preferably using a low pass digital filter to illiminate noise at 506. Each of the filtered digital signals are then averaged and a first and second DC values, DC1 and DC2, are obtained at 506. The microprocessor 302 applies a phase modulated signal at 510 to limit the total electrical output current of the generator 106 if DC1/DC2 is outside of a range between $R_{LL}$ and $R_{LH}$. The microprocessor 302 applies the phase modulated signal to the switch 322 via the line 324 which in turn reduces the duty cycle of the field current through the field coil 320. If DC1/DC2 is outside of a range between $R_{CL}$ and $R_{CH}$ the microprocessor 302 applies a step signal to the switch 322 to turn off the field current through the field coil 320 ceasing the total electrical output current of the generator 106 at 514.

Figure 6:
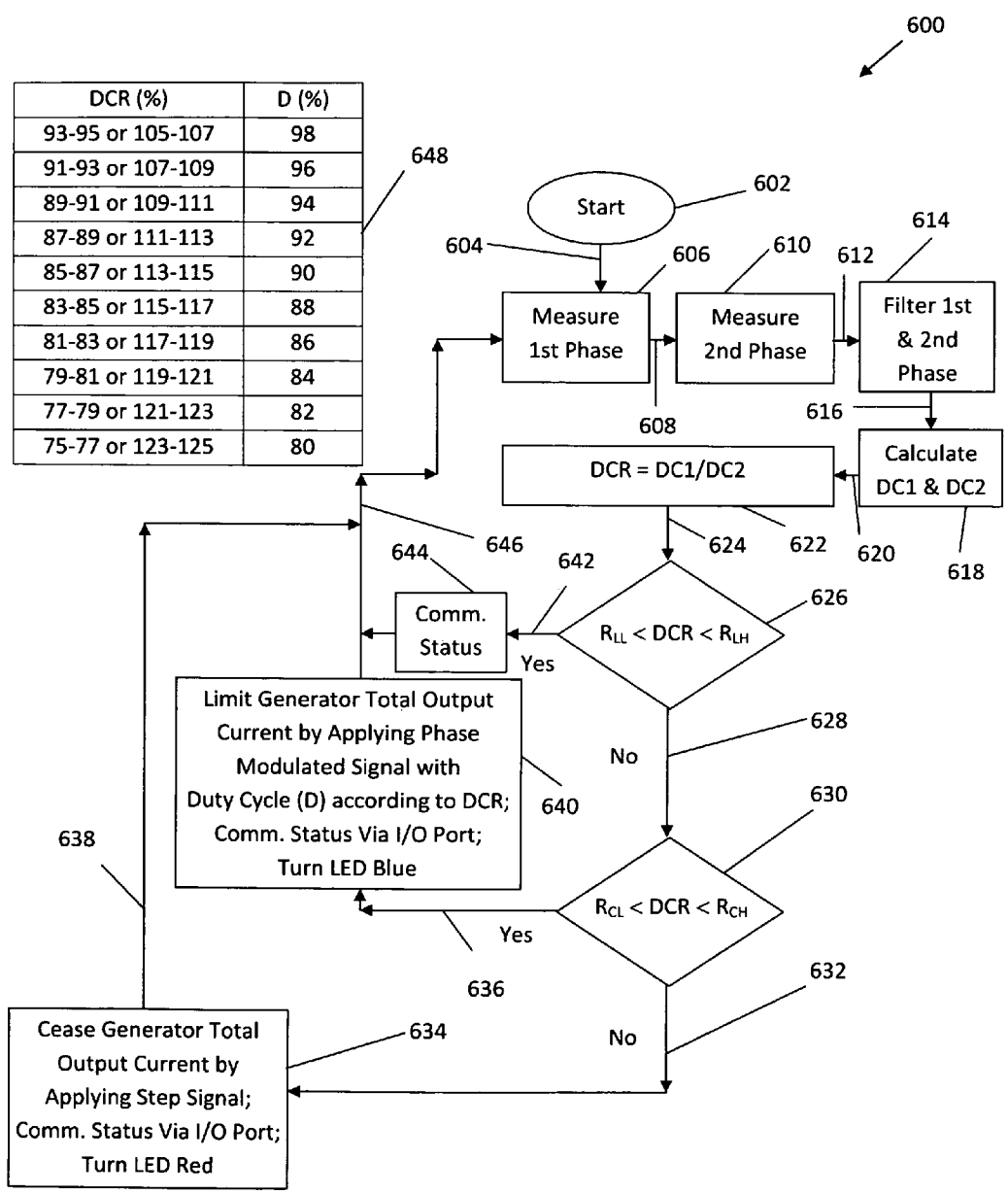
FIG. 6 is a flow diagram of one preferred method of monitoring and control of the generator in the vehicle electrical system of FIGS. 1 and 2 that maybe implemented on a processor, included in the control device, further detailing the conditions under which the generator's total output current is either limited or ceased.

FIG. 6 is a flow diagram 600 of one preferred method of operation of the control device of FIG. 1 or 2 further illustrating the implementation of a programming code in a processor such as the processor 302 of FIG. 3. Upon power up at 602, the processor 302 measures a first alternating phase voltage signal from a first phase at 606. The processor 302 then measures a second alternating phase voltage signal from a second phase, belonging to the same or a different stator, at 610. The processor 302 performs digital filtering operation on the two phase voltage signals at 614 and computes two DC values, DC1 and DC2, from the filtered signals at 618. DC1 and DC2 are compared to one another by computing the ratio DCR=DC1/DC2 at 622. It should be clear to artisans of ordinary skill that the ratio DCR could as well be computed by dividing DC2 by DC1. Consequently, there is no preference for any one phase winding in these calculations. DCR is then compared to a range between $R_{LL}$ and $R_{LH}$. If DCR is within this range, i.e. normal conditions, the processor 302 branches at 642, communicates its status at 644, and branches at 646 to measure another set of alternating phase voltage signals. However, if DCR is outside of the range between $R_{LL}$ and $R_{LH}$, i.e. malfunction, then the processor 302 branches at 628 to perform another comparison at 630. At this step, the processor 302 determines the severity of the loss of symmetry between phase one and phase two, i.e., symmetry between two different waveforms associated with phase one and phase two, not for the positive and negative parts of an individual waveform associated with each of the phase one and phase two as is the case for traditional determination of AC system health. Specifically, if DCR is within the range between $R_{CL}$ and $R_{CH}$, the processor branches at 636 to limit the generator's total output current. This is accomplished by applying a phase modulated signal with a duty cycle (D) according to the value of DCR at 640. According to one embodiment, the duty cycle D may be obtained from a look up table 648. The processor 302 also communicates the status via the I/O bus 328 and turns blue the LED 314. If DCR is outside the range between $R_{CL}$ and $R_{CH}$, the processor branches at 632 to cease the generator's total output current which is accomplished by applying a step signal at 634. The processor 302 also communicates the status via the I/O bus 328 and turns red the LED 314. In either case of limiting or ceasing, the processor 302 branches at 646 or 638 to measure another set of alternating phase voltage signals.

Figure 7:
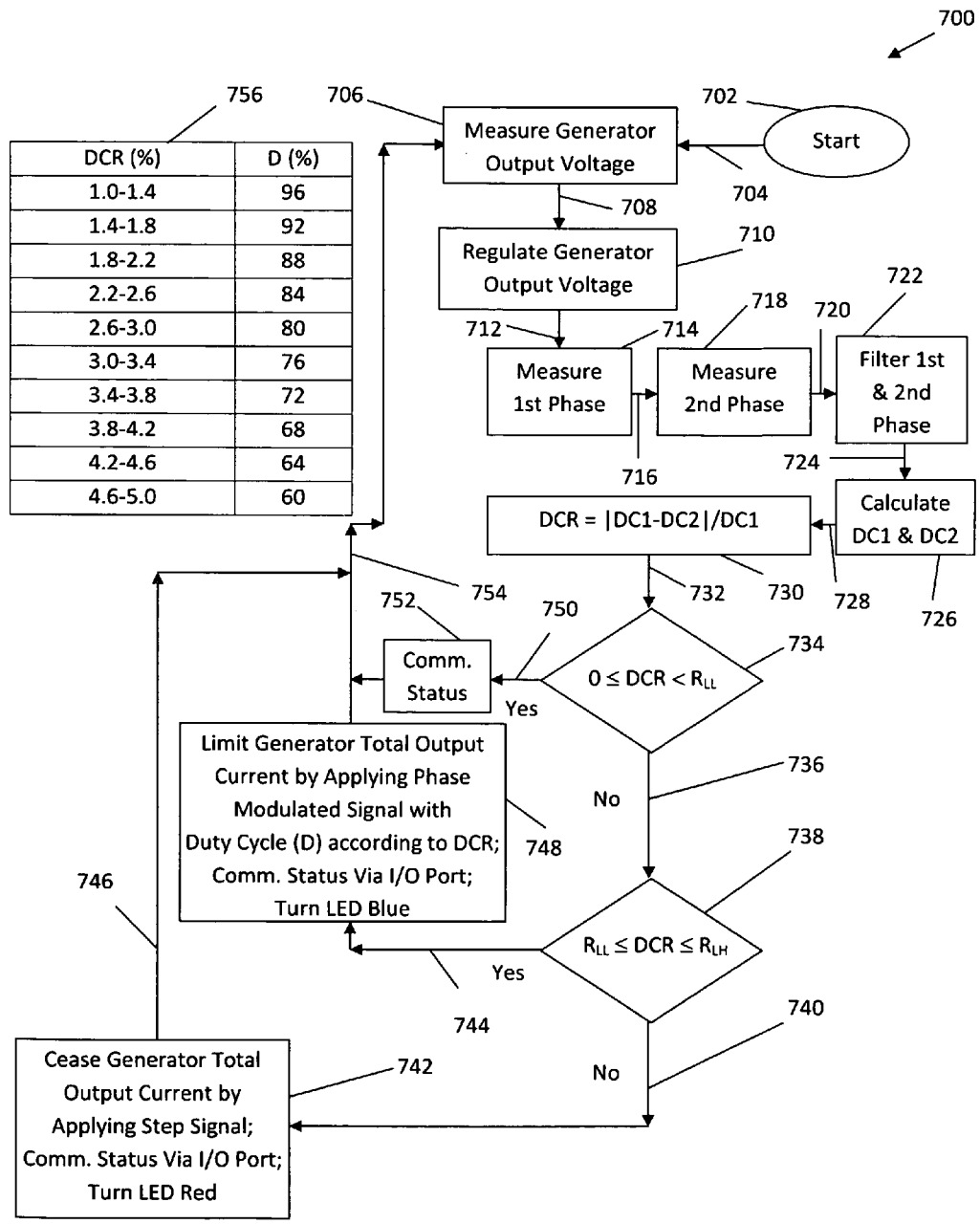
FIG. 7 is a flow diagram of one preferred method of monitoring and control of the generator in the vehicle electrical system of FIGS. 1 and 2 that maybe implemented on a processor, included in the control device, further detailing the conditions under which the generator's total output current is either limited or ceased.

FIG. 7 is a flow diagram 700 of one preferred method of operation of the control device of FIG. 1 or 2 further illustrating another implementation of a programming code in the processor 302. In particular, the present implementation involves a different way of evaluating the loss of symmetry between the two phases. Furthermore, as discussed above, in the present embodiment the processor 302 also operates as a voltage regulator.

Upon power up at 702, the processor 302 measures the generator output voltage at 706 and regulates the generator output voltage at 710. Similar to the embodiment described above in FIG. 6, the processor 302 measures a first alternating phase voltage signal from a first phase at 714 and a second alternating phase voltage signal from a second phase, belonging to the same or a different stator, at 718. The processor 302 performs digital filtering operation on the two phase voltage signals at 722 and computes two DC values, DC1 and DC2, from the filtered signals at 726. DC1 and DC2 are compared to one another by computing the ratio DCR=|DC1−DC2|/DC1 at 730. It should be clear to artisans of ordinary skill that the ratio DCR could as well be computed by subtracting DC1 from DC2 and dividing the result by DC2. Consequently, there is no preference for any one phase winding in these calculations. DCR is then compared to a range between 0 and $R_{LL}$. If DCR is within this range, i.e. normal conditions, the processor 302 branches at 750, communicates its status at 752, and branches at 754 to measure the generator output voltage at 706. However, if DCR is outside of the range between 0 and $R_{LL}$, i.e. malfunction, then the processor 302 branches at 736 to perform another comparison at 738. At this step, the processor 302 determines whether to limit or cease the generator's total output current depending on the severity of the loss of symmetry between phase one and phase two. Specifically, if DCR is within the range between $R_{LL}$ and $R_{LH}$, the processor 302 branches at 744 to limit the generator's total output current. This is accomplished by applying a phase modulated signal with a duty cycle (D) according to the value of DCR at 748. According to one embodiment, the duty cycle D may be obtained from a look up table 756. The processor 302 also communicates the status via the I/O bus 328 and turns blue the LED 314. If DCR is outside the range between $R_{LL}$ and $R_{LH}$, the processor 302 branches at 740 to cease the generator's total output current which is accomplished by applying a step signal at 742. The processor 302 also communicates the status via the I/O bus 328 and turns red the LED 314. In either case of limiting or ceasing, the processor 302 branches at 754 or 746 to measure the generator's output voltage at 706.

The foregoing discloses a vehicle electrical system comprising a generator and a control device that monitors the generator phase windings and selectively limits or ceases the generator's total electrical output current when a loss of symmetry between two such phase windings are detected. It should be clear to an artisan of ordinary skill that the term symmetry refers to the symmetry between different waveforms associated with the different phases, not for the positive and negative parts of an individual waveform associated with each of the two phases as is the case for traditional determination of AC system health. In particular, when the loss of symmetry is too severe, the control device ceases the generator's total electrical output current. However, if the loss of symmetry is within an acceptable range, the control device limits the generator's total electrical output current in an effort to provide electrical power to the vehicle electrical load while preventing irreversible damage to the generator.

The foregoing explanations, descriptions, illustrations, examples, and discussions have been set forth to assist the reader with understanding this invention and further to demonstrate the utility and novelty of it and are by no means restrictive of the scope of the invention. It is the following claims, including all equivalents, which are intended to define the scope of this invention.

What is claimed is:

1. A vehicle electrical system comprising:
   (a) a generator comprising two or more phase windings associated with one or more stators, said two or more phase windings operative to generate two or more alternating phase signals; and
   (b) a control device responsive to the two or more alternating phase signals and operative to determine a first and second average values of two of the two or more alternating phase signals, and to at least one of limit and cease a total electrical output current of the generator, via a generator output power controller, when the first average value differs from the second average value by a predetermined value.

2. The system of claim 1, wherein the two or more alternating phase signals comprise two or more alternating phase voltage signals.

3. The system of claim 1, wherein the two or more alternating phase signals comprise two or more alternating phase current signals.

4. The system of claim 1, wherein the two alternating phase signals are generated by two different phase windings associated with two different stators.

5. The system of claim 1, wherein the generator output power controller comprises at least one of a voltage regulator, a field coil, and a semiconductor switch.

6. The system of claim 1, wherein the predetermined value is substantially between 1% to 5%.

7. The system of claim 1, wherein the control device is further operative to generate an error signal indicative of a fault condition when the first average value differs from the second average value by the predetermined value.

8. The system of claim 1, wherein the control device further comprises a voltage regulator capable of maintaining an output voltage of the generator substantially at a regulation voltage.

9. A method for controlling a vehicle electrical system, said system comprising a generator, said method comprising:
   (a) generating two or more alternating phase signals via two or more phase windings associated with one or more stators included in the generator;
   (b) determining a first and second average values of two of the two or more alternating phase signals; and
   (c) at least one of limiting and ceasing a total electrical output current of the generator, via a generator output power controller, when the first average value differs from the second average value by a predetermined value.

10. The method of claim 9, further comprising:
    (d) generating an error signal indicative of a fault condition when the first average value differs from the second average value by the predetermined value.

11. The method of claim 9, further comprising:
    (d) maintaining an output voltage of the generator substantially at a regulation voltage via a voltage regulator.

* * * * *